Reissued June 13, 1933

Re. 18,865

UNITED STATES PATENT OFFICE

ALEXANDRE BLUHM, OF PARIS, FRANCE, ASSIGNOR, BY MESNE ASSIGNMENTS, TO FERODO LIMITED, OF SOVEREIGN MILLS, CHAPEL-EN-LE-FRITH, DERBYSHIRE, ENGLAND

FRICTION MATERIAL

No Drawing. Original No. 1,722,890, dated July 30, 1929, Serial No. 158,825, filed January 3, 1927, and in France January 13, 1926. Application for reissue filed January 16, 1931. Serial No. 509,262.

The present invention relates to friction material, i. e. to substances which are selected or manufactured for use upon mechanical elements for the purpose of producing friction between the same, and among such substances, it chiefly relates to material which is obtained by the use of textile fabrics, wadding or powder, either vegetable or mineral, or both combined, and an organic or inorganic binding substance. In accordance with the requirements of the weaving process, or for other reasons, such substances may already contain a metal or alloy.

The invention has for its object firstly to augment and to stabilize the coefficient of friction whereby it will be less affected by temperature changes, pressure or speed, and secondly to diminish the effect which is known as the erosion of drums. This effect is due to the adhesion, to the drum or other element coacting with the friction substance, of the metallic parts which may enter into the composition of the said substance. This adhesion is followed by a gripping or removal of the metal of the drum or the like, and it thus becomes a source of erosion.

The double purpose above proposed can be attained by the use of metallic lead either in the pure state or employed with other metals or alloys in which it predominates.

The lead augments and stabilizes the coefficient of friction at all temperatures, pressures and speeds. It interposes between the metal of the drum or like friction piece, and the facing portion, a very thin film which prevents the adhesion of the metals in use, thus eliminating the cause of the erosions.

The metallic lead either in the pure state or employed with other metals in the shape of alloys in which it predominates, may be incorporated into the friction material in various manners, as follows:

The lead may be used in the colloidal, pulverulent or fibrous state, as obtained either by the electrolysis of a lead compound which absorbs the friction substance or one of the raw materials composing the same, the cathode consisting of a metallic network contained in said material; or by a purely chemical process by the absorption of the friction material (or the raw material employed in its manufacture) by a lead compound, and by a direct reduction or by its conversion into an insoluble compound, followed by a reducing treatment.

Having thus described my invention, what I claim as new therein, is:—

1. A friction element comprising a base of frictional material containing a binder and metallic lead in sufficient quantity to stabilize the co-efficient of friction, the operative surface of the friction element being composed of an intimate mixture of metallic lead and friction material whereby there is interposed between the metal of the drum or like friction device and the surface of the friction element a relatively thin film of metallic lead which prevents erosion of the co-acting parts when in use.

2. A friction element obtained by the use of textile fabrics, wadding or powder, either vegetable or mineral, or both combined, and an organic and inorganic binding substance, capable of producing friction, containing metallic lead, or an alloy in which lead predominates, in sufficient quantity to stabilize the co-efficient of friction under all conditions of temperature, pressure or speed, the operative surface of said friction element being composed of an intimate mixture of metallic lead and friction material whereby to interpose between the metal of the drum or the like friction device and the surface of the friction element a relatively thin film of metallic lead to prevent erosion of the co-acting parts when in use.

ALEXANDRE BLUHM.